E. Bancroft,
Shaft Hanger,
No. 463, Reissued May 12, 1857.
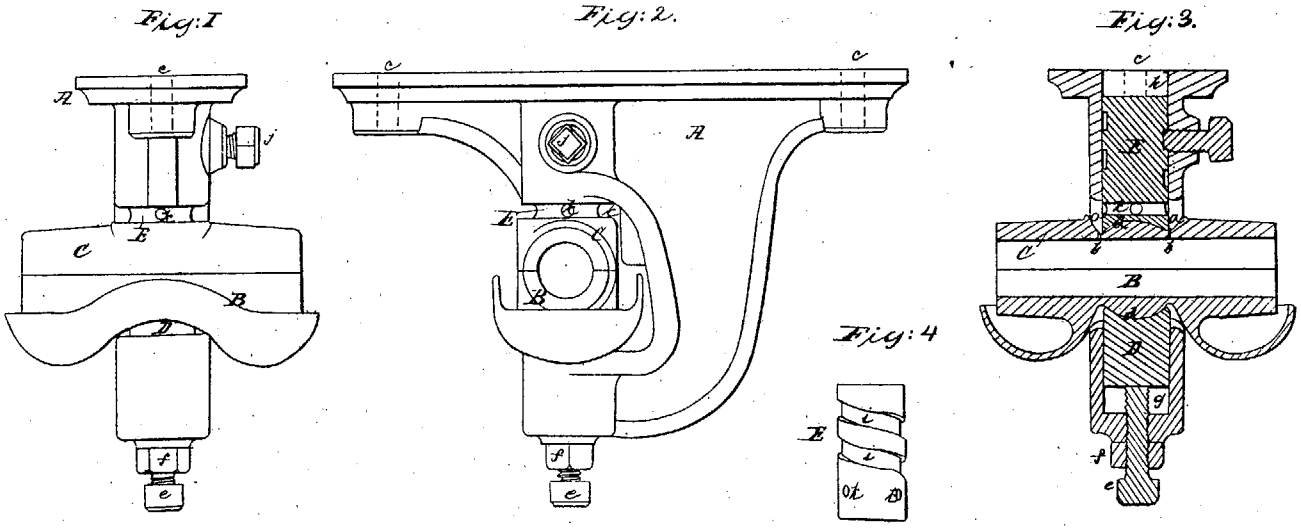
Witnesses:
Wm P. Bancroft
Wm Abbott.
Inventor:
Edmund Bancroft
by
Joseph Bancroft

UNITED STATES PATENT OFFICE.

JOSEPH BANCROFT, OF WILMINGTON, DELAWARE, EXECUTOR OF THE ESTATE OF THE LATE EDWARD BANCROFT, DECEASED.

IMPROVEMENT IN HANGING SHAFTS IN MILLS.

Specification forming part of Letters Patent No. 6,780, dated October 9, 1849; Reissue No. 463, dated May 12, 1857.

*To all whom it may concern:*

Be it known that EDWARD BANCROFT, of Philadelphia, Pennsylvania, in his lifetime invented certain new and useful Improvements in the Method of Hanging Shafts in Mills; and that the following is a full, clear, and exact description thereof, reference being had to the accompanying drawings, making part of this specification, in which—

Figure 1 is a front elevation; Fig. 2, a side elevation with the shafts in section; Fig. 3, a section of the hanger and box, and Fig. 4 another section at right angles to Fig. 3.

The same letters indicate like parts in all the figures.

The said invention of the said EDWARD BANCROFT, deceased, consists in constructing boxes for hanging shafting in mills, with circular concavities on the outer surface and on opposite sides, each surrounding a bulb or projection in the form of a segment of a sphere, so that when the boxes are put on a journal, and the said bulbs or projections are embraced by or held between sockets forming part of a hanger, bracket, or pillow-block, the said bulbs or projections will form segments of a common sphere, which will allow the box with the shaft in it to play freely in all directions, in the manner of a universal joint, the circular concavities around each bulb admitting of the required extent of play on the holding sockets, while at the same time the requisite strength in the center of the box is obtained by a small amount of metal around the circular concavities.

The said invention also consists in combining boxes made with a segment of a sphere on opposite sides with the hanger, pedestal, or pillow-blocks by means of adjustable sockets, which embrace the spherical segments, and which are so connected with the hanger, pedestal, or pillow-blocks as to be adjustable therein, whereby the boxes can be readily elevated or depressed to bring the shaft in line, and at the same time the boxes can vibrate in the manner of a universal joint to adapt themselves to the line of the shaft when out of true.

Said hanger is constructed of five main parts, more or less, as the case may require—viz., the pedestal or principal part A, the lower part, B, of the box, to which the oil-cup is attached, the upper part or cap, C, of the box, in which is the reservoir *a* and oil-conducting orifices *b*, the lower socket, D, which sustains the box, and the upper socket, E, which by its action retains the box secure in its place when adjusted.

The pedestal A of the hanger is attached to the floor or timbers of the mill by means of screw-bolts passing through the holes *c* (indicated by dots) near its extremities. The form of this part may be varied to adapt it to the situation in which it may be used, whether suspended from the under side of a beam attached to the side of a post or resting on the floor or upper surface of a wall. The form will vary according to the situation, in order that the securing-bolts may be properly applied. The shaft governs the position of the box with respect to itself by means of the common ball-and-socket joint *d*, as shown in section in Fig. 3.

The vertical adjustment of the box is obtained by means of a set-screw, *e*, and pinching-nut *f* acting on the under side of the lower socket, D, which latter is accurately fitted into a cylindrical cavity, *g*, in the lower part of the pedestal A. The box is firmly held in its place by the upper socket, E, which is also accurately fitted in a similar cylindrical cavity, *h*, directly over and in a line with the lower cavity, which holds the socket D, the spherical portion of the box being thus embraced between these two sockets.

The sockets are furnished with a thread or screw for a portion of their length near one end, and the hanger or pillow-block is tapped out to correspond therewith for the purpose of adjusting the shaft vertically, the said sockets being prevented from turning or unscrewing when adjusted by the set-screw, which pinches them on the side, and two holes, *k*, are drilled through said sockets at right angles near its lower extremity, or a transverse groove cut on the end, in which a key may be inserted to turn the socket. These holes are for the purpose of introducing a lever and screwing the socket E down onto the box after it has been adjusted, where it is retained and prevented from unscrewing by the set-screw *j*, which is screwed up tight against the bottom of the spiral groove or thread *i*. By slacking the set-screw *j* the socket E may be run up out of the way to allow the cap of the box to be taken off for cleaning or any other purpose.

The shaft may also be taken out and the lower part of the box may also be removed without altering in any manner the adjustment of the parts, and the whole may be replaced in their original positions with certainty and ease. That part of the box and cap which is embraced by the sockets D and E is made a segment of a true sphere by means of a tool adapted to the purpose, and the concavities of the sockets are accurately made of corresponding size, so as to insure a close and perfect fit in whatever position the box may be thrown by the governing action of the shaft.

Among the advantages afforded by this arrangement are that it may be safely used for the largest and heaviest kind of mill-work by merely proportioning the parts to the size of the shafts, and the box may be taken off when worn out and another put on at very little cost without altering or disturbing any other part. In cases where a quick speed is required on shafting of considerable weight a bearing of any desirable length may be used by these means with a certainty of a beneficial result.

I do not claim, broadly, the employment of spherical segment boxes when such spherical segment extends entirely around such box and is embraced within and confined by an entirely-surrounding outer box, as this has long been known.

What I claim as the invention of the said EDWARD BANCROFT, deceased, and desire to secure by Letters Patent, is—

1. Constructing the boxes for hanging shafting in mills with circular cavities on the outer surface and on opposite sides, each cavity surrounding a bulb or projection in the form of a segment of a sphere, and having the required thickness of metal outside of such cavities for strength, substantially as described, when such boxes are combined with holding-sockets which embrace said bulbs, and which are so placed within the said concavities as to allow the boxes thus held to play within the sockets in the manner of a universal joint, substantially as specified.

2. Combining the box, which is provided with segments of a sphere on its outer surface, substantially as specified, with the hanger, pedestal, or pillow-block by means of adjustable sockets, substantially as specified.

JOSEPH BANCROFT,
*Executor of Edward Bancroft, deceased.*

Witnesses:
ALBERT W. SMITH,
WM. SELLERS.